Aug. 16, 1960           J. BLAKE           2,949,383
PROCESS OF COATING WITH METHYL METHACRYLATE COMPOSITION
THEREFORE AND ARTICLE PRODUCED THEREBY
Filed May 6, 1958

INVENTOR
JULES BLAKE

BY

AGENT

United States Patent Office 2,949,383
Patented Aug. 16, 1960

2,949,383

PROCESS OF COATING WITH METHYL METHACRYLATE COMPOSITION THEREFORE AND ARTICLE PRODUCED THEREBY

Jules Blake, Springfield, Pa., assignor to E. I. du Pont de Nemours and Company, Wilmington, Del., a corporation of Delaware Filed May 6, 1958, Ser. No. 733,400

18 Claims. (Cl. 117—72)

This invention relates to a finishing system and more particularly to articles comprising a substrate having a pigmented prime coat and in adherent contact therewith a superposed topcoat of methyl methacrylate lacquer. This invention also relates to coating compositions useful in the aforementioned articles.

Methyl methacrylate lacquers, that is, coating compositions containing a solvent and, as the principal film-forming constituent, polymers of methyl methacrylate, can be applied to substrates and dried to form films or coatings which have outstanding durability and gloss retention. Unfortunately, such coatings do not have adequate metal-protecting and rust-inhibiting properties for protecting metal articles which are to be used outdoors, such as, for example, steel automobile bodies; therefore, it is necessary to apply a protective coating to such articles before applying a topcoat of methyl methacrylate lacquer.

The coating which is applied before the methyl methacrylate lacquer to provide metal protection and inhibit rusting is known as a primer and the dried coat resulting from the application of such a material is commonly referred to as the primer coat or prime coat. The conventional primers, such as those commonly used under alkyd resin enamels, amino-aldehyde resin enamels and nitrocellulose lacquers, are not satisfactory prime coats for methyl methacrylate lacquers. Methyl methacrylate topcoats applied over these conventional prime coats crack and do not adhere well. Therefore, finishing systems consisting of a conventional prime coat and a methyl methacrylate lacquer topcoat are not suitable for such uses, for example, as automobile finishes.

I have found that by introducing an aminated or ammoniated glycidyl methacrylate radical into at least one polymer of methyl methacrylate in a methyl methacrylate lacquer, such lacquers can be firmly adhered to substrates coated with conventional prime-coat compositions. I have further found coating compositions which are useful in the aforementioned finishing systems and are characterized by their durability, gloss and balance between thermoplasticity and craze resistance.

The articles of this invention comprise a substrate having an adherent multi-layer coating which comprises a pigmented prime coat in adherent contact with the substrate and a superposed methyl methacrylate lacquer topcoat in adherent contact with the prime coat, each layer of the topcoat having as the essential film-forming material at least one polymer of methyl methacrylate, at least one polymer of methyl methacrylate in the layer of the topcoat immediately adjacent the prime coat containing in the polymer chain the aminated or ammoniated glycidyl methacrylate radical:

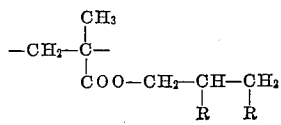

wherein one R is a hydroxyl group or an oxygen anion and the second R is the amino residue of a member of a class consisting of ammonia and monoamines, the residue being bonded through amino nitrogen. The aminated or ammoniated glycidyl methacrylate radical exclusive of amino residue constitutes about from 20 to 0.2% of the total weight of polymers of methyl methacrylate in the topcoat layer containing the radical.

Various embodiments of the articles of this invention are shown in the accompanying drawing wherein.

Figure 1:
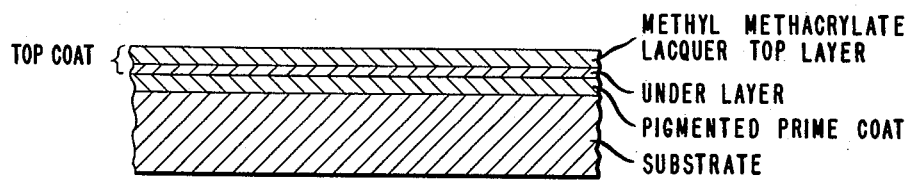
Figure 1 shows an enlarged cross-sectional view of a representative portion of an article comprising a substrate having an adherent coating comprising a pigmented prime coat and a multilayer topcoat consisting of an underlayer containing a polymer of methyl methacrylate containing an ammoniated or aminated glycidyl methacrylate radical and a methyl methacrylate lacquer top layer.
Figure 2:
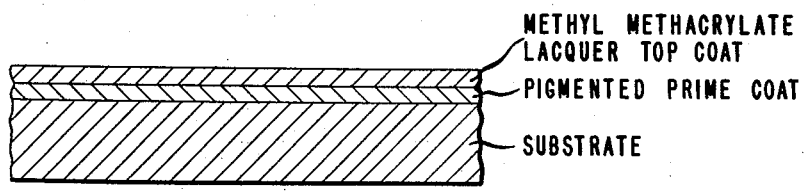
Figure 2 shows an enlarged cross-sectional view of a representative portion of an article comprising a substrate having an adherent coating comprising a pigmented prime coat and a single-layer methyl methacrylate lacquer topcoat containing a polymer of methyl methacrylate containing an ammoniated or aminated glycidyl methacrylate radical.

The term "polymers of methyl methacrylate" as used herein refers to both homopolymers of methyl methacrylate and to copolymers of methyl methacrylate with minor amounts, for example, in the order of 2 to 25% by weight of another material copolymerizable therewith such as for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, and styrene. Preferred polymers are homopolymers of methyl methacrylate and copolymers thereof containing about 98% by weight of methyl methacrylate and 2% by weight of methacrylic acid.

The preferred methyl methacrylate polymers including those containing the ammoniated or aminated glycidyl methacrylate radical have a relative viscosity of about 1.117 to 1.196 corresponding to a molecular weight of about 55,000 to 105,000. Polymers of methyl methacrylate falling within this range of viscosities have a unique solubility and viscosity which makes it possible, for example, to spray thick, smooth lacquer topcoats thereof in a relatively few individual coatings. In addition, dried lacquer coatings of such polymers have an outstanding balance of properties such as, for example, durability, gloss and flexability. Methyl methacrylate lacquers based on such polymers are disclosed and claimed in copending application Serial No. 434,661, filed June 4, 1954, by Laverne W. Crissey and John H. Lowell. Still other methyl methacrylate lacquers containing such polymers which are particularly useful for spray application are disclosed and claimed in copending application Serial No. 402,498, filed January 6, 1954, by Laverne W. Crissey and John H. Lowell, now abandoned.

The term "relative viscosity" as used herein to specify a property of the polymers of methyl methacrylate is the value obtained by dividing the efflux time of a solution A, of the polymer of methyl methacrylate by the efflux time of the solvent, B, used in the solution, the efflux times being measured in accordance with the procedure of A.S.T.M.-D-445-46T, Method B. Polymer solution A is a solution of 0.25 gram of the polymer methyl methacrylate being tested in 50 cc. of ethylene dichloride, and the solvent B is ethylene dichloride. The times are determined at 25° C. in a standard apparatus currently marketed under the designation of Modified Ostwald Viscosimeter, Series 50.

The polymers of methyl methacrylate can be prepared by well known methods by polymerizing methyl methacrylate monomer with or without another monomer copolymerizable therewith either in bulk, in solution, or in particulate form to produce products having the required relative viscosity. Preferably, the reaction is carried out in the presence of a free-radical catalyst.

The preferred method of introducing the ammoniated or aminated glycidyl methacrylate radical into a polymer of methyl methacrylate is to react a copolymer of methyl methacrylate and glycidyl methacrylate with either aqueous or anhydrous ammonia, one or more monoamines or a mixture of ammonia and one or more monoamines. Alternately, a monomer having a structure corresponding to the formula given above can be copolymerized with methyl methacrylate to yield a polymer of methacrylate having the aminated or ammoniated glycidyl methacrylate radical. The copolymers of methyl methacrylate and glycidyl methacrylate can be made by the conventional procedures mentioned above by copolymerizing about from 80 to 99.8 and preferably from 97 to 99.6 parts by weight of methyl methacrylate or methyl methacrylate and minor amounts, for example, 2 to 25 parts by weight of one of the aforementioned copolymerizable monomers, with 20 to 0.2 and preferably 3 to 0.4 parts by weight of glycidyl methacrylate. Less than 20% and preferably less than 3% glycidyl methacrylate is used in any one polymer of methacrylate because it is easier to prepare stable polymers thereby. Copolymers of methyl methacrylate and glycidyl methacrylate are preferred. If minor amounts of a third copolymerizable monomer are used, the monomer should not react with the glycidyl group or with ammonia or the monoamine used.

Primary amines such as tertiary butyl amine, ethanolamine, ethyl amine and tertiary octyl amine; secondary amines such as dimethyl amine, diethanolamine and methyl ethyl amine; and tertiary amines such as dimethyl benzyl amine, N-methyl morpholine, dimethyl palmityl amine and triethanol amine are illustrative monoamines which can be used to aminate the glycidyl methacrylate radical. Ammonia and simple aliphatic primary and secondary amines such as for example, 1 to 4 carbon alkyl and alkanol amines are preferred because they show little steric hinderance, thus react rapidly, and because of the high stability of products made therewith. Ammonia is particularly preferred because it reacts rapidly and because it is relatively inexpensive.

The monoamine or ammonia and copolymer are mixed, then heated, preferably in a closed system under a pressure of about 20 to 100 p.s.i., until the reaction between the monoamine or ammonia and the epoxy groups in the copolymer has run substantially to completion. The particular reaction conditions vary with the amount and reactivity of the monoamine or ammonia. Usually, the reaction mixture is heated for from 2 to 30 hours and preferably 5 to 10 hours at about from 50 to 150° C. and preferably 85 to 100° C. Preferably, an excess of the monoamine or ammonia is added to the reaction mixture. This speeds the reaction and insures that substantially all of the epoxy groups in the copolymer react. Useful products are obtained when less than the equivalent amount of monoamine or ammonia is used; however, the resulting products are somewhat less stable and often cannot be stored for long periods of time. The stability of incompletely reacted copolymers can be improved by adding for example, ethyl acetate, butyl acetate, amyl acetate, or acetic acid to the reaction mixture. The amount of unreacted epoxy groups can be determined by adding hydrochloric acid to a portion of the reaction mixture, then back titrating the resulting solution with silver nitrate.

The amination reaction can be carried out in volatile solvents, such as, for example, toluene, xylene, methyl isobutyl ketone, butyl alcohol, amyl alcohol, isopropyl alcohol and other aliphatic, cycloaliphatic and aromatic hydrocarbons, ethers, ketones and alcohols, such as are conventionally used in coating compositions. Hydroxylated solvents such as alcohols are preferred because they catalyze the amination reaction. Small portions of water also can be added to the solvent mixture to catalyze the reaction.

During the amination reaction, the epoxy ring on the glycidyl methacrylate moiety opens and the ammonia or monoamine is bonded to one of the ring carbon atoms through amino nitrogen. In the case of ammonia or hydrogen-bearing monoamines, a hydroxyl group is formed on the second carbon atom. For example, in the case of ammonia the reaction proceeds substantially as follows:

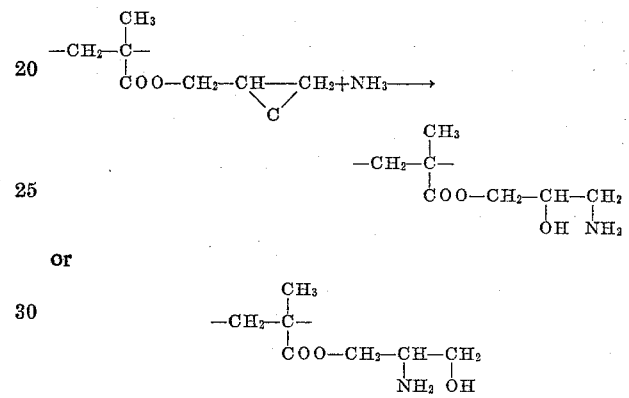

In the case of tertiary amines, an internal quaternary ammonium alkoxide is believed to be formed. For example, with dimethyl benzyl amine the reaction is believed to be as follows:

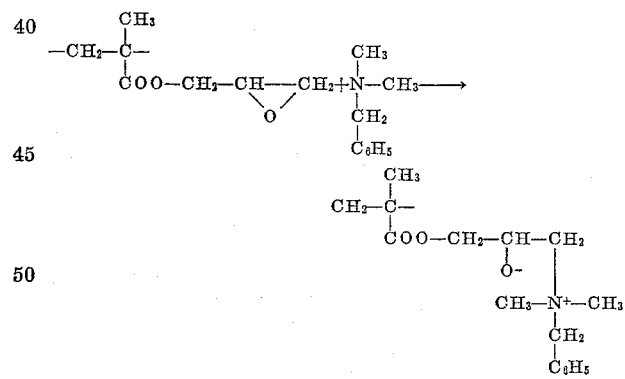

or

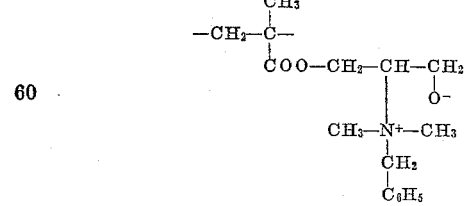

The articles of this invention are prepared by first coating a substrate with a conventional primer. Although this invention is particularly directed to the coating of metal substrates, other substrates such as those of wood and glass can also be advantageously coated with the finishing system of this invention. The particular primer which is used is not critical; any of the conventional air drying or baking type primers can be used. Oil-modified alkyd resins such as, for example, soya oil, linseed oil or dehydrated castor oil modified glycerol or pentaerythritol phthalates containing conventional amounts of pigments, modifiers and additives are one preferred type of primer. These alkyd resin primers have excellent metal-protecting and rust-inhibiting properties and an excellent overall balance of film properties. Primers containing alkyd resins modified with urea and melamine formaldehyde resins or polyepoxide resins and primers containing oil-modified ester gum varnishes are examples of other conventional compositions which can be used. These primers are applied by conventional fluid coating techniques such as for example, flow, dip, spray, brush or roller coating, then dried or baked. Typically for example, wet coatings of alkyd resin coatings are baked about 15 to 30 minutes at about 80 to 200° C. to yield prime coats 0.2 to 2 mils thick.

Next, the methyl methacrylate lacquer topcoat is applied over the prime coat. The topcoat can be applied either as a multi-layer topcoat or as a single-layer topcoat. Whether the topcoat is applied in one or several layers, the layer immediately adjacent the prime coat must contain at least one polymer containing the aforementioned ammoniated or aminated glycidyl methacrylate radical. Also, the layer immediately adjacent the prime coat must contain based on the total weight of polymers of methacrylate in that layer 0.2 to 20 and preferably 0.4 to 3% of the aforementioned radical exclusive of amine or ammonia residues. Each layer of the topcoat must contain as the essential film-forming material at least one polymer of methyl methacrylate.

One preferred method of applying the topcoat is to apply an underlayer having as the polymer of methyl methacrylate and as the sole film-forming material the polymer of methyl methacrylate containing the aminated or ammoniated glycidyl methacrylate radical. The underlayer is applied over the prime coat with or without baking. The thickness of the dried underlayer is not critical; typically, dried undercoats about from 0.1 to 2 mils thick are used under top layers 0.2 to 2 mils thick. If thin films of the wet underlayer are used, that is, films which are about 0.3 to 0.5 mil thick when dry, the top layer or layers of methyl methacrylate lacquer can be applied almost immediately after the wet underlayer is applied. If thicker films of the underlayer composition are coated over the prime coat, the wet underlayer should be allowed to stand for a few minutes before the topcoat is applied; however, no baking or prolonged drying are required for the underlayer applied in this manner.

The underlayer composition can contain conventional plasticizers, pigments, modifiers such as dispersing agents and flow-control agents, and solvents such as those used in the amination reaction. Examples of plasticizers are benzyl butyl phthalate, dibutyl phthalate, triphenyl phosphate, 2-ethyl hexyl benzyl phthalate and dicyclohexyl phthalate. Pigments such as, for example, metal oxides, hydroxides, chromates, silicates, sulfides, sulfates, carbonates and carbon blacks, organic dyestuffs and lakes thereof and metal flake pigments can be used in proportions normally used in the art.

When the topcoat is applied as a single layer or when several layers of the same composition are applied in the topcoat, the polymer of methyl methacrylate containing the aminated or ammoniated glycidyl methacrylate radical can be used as the sole film-forming material; however, preferably, this polymer of methyl methacrylate is used in combination with another polymer of methyl methacrylate which does not contain the aminated or ammoniated glycidyl methacrylate radical, a compatible alkyd resin or cellulose acetate butyrate. Such compositions are less expensive and easier and more convenient to formulate than compositions having the polymer of methyl methacrylate containing the aminated or ammoniated glycidyl methacrylate radical as the sole film-forming constituent. In addition, the compositions containing compatible alkyd resin or cellulose acetate butyrate have a superior balance of craze resistance, thermoplasticity and unbuffed gloss.

One preferred topcoat composition for applying directly on primed substrates consists of 25 to 90 parts by weight of unmodified polymer of methyl methacrylate and 75 to 10 parts by weight of the polymer of methyl methacrylate containing the aminated or ammoniated glycidyl methacrylate radical. Plasticizers, pigments and solvents such as those used with the underlayer are preferably added to the composition in conventional amounts.

Another preferred composition for applying directly onto primed substrates comprises essentially 100 parts by weight of film-forming constituents consisting of up to 35 and preferably 10 to 25 parts by weight of cellulose acetate butyrate or up to 50 and preferably 30 to 40 parts by weight of compatible alkyd resin or a combination thereof together with at least 50 parts by weight of the polymer of methyl methacrylate containing the aminated or ammoniated glycidyl methacrylate radical or mixtures thereof with other unmodified polymers of methyl methacrylate.

The cellulose acetate butyrate can be any of the wide variety of lacquer-grade materials conventionally used in the coating art. The most common characteristic used to define the cellulose acetate butyrate is viscosity. The most widely used grades have viscosities of one-quarter second to five seconds. These are the most useful grades for this invention, the one-quarter to one-half second grades being preferred; however, mixtures containing small portions of grades having viscosities as high as fifty or one hundred seconds can also be used. The one-quarter second viscosity corresponds to about 50 centipoises when measured as a 12.2% solution in a solvent mixture defined as Formula A in A.S.T.M.–D–301–54T. On the same basis, five seconds correspond to about 1800 centipoises, fifty seconds to about 18,000 centipoises and one hundred seconds to about 38,000 centipoises.

Any monocarboxylic acid modified alkyd resin which is compatible with the other film-forming constituents in the methyl methacrylate lacquers used in the topcoat can be used. As used herein "compatible" means that alkyd resin does not react with or separate from the other film-forming constituents in the completely formulated liquid methyl methacrylate lacquer topcoat composition. The preferred alkyd resins have an acid number of 10 or less and preferably 5 or less, an oil length of 15 to 55 and preferably 20 to 35 and 1 to 6% and preferably 3 to 5% of unreacted hydroxyl. Oil length means the percent by weight of monocarboxylic acid used in preparing the resin expressed as percent by weight of triglyceride based on the total weight of resin. Acid number is the number of milligrams of potassium hydroxide necessary to neutralize the acidity of one gram of alkyd resin. Percent of unreacted hydroxyl means the percent by weight of glycerol based on the total weight of resin which has an amount of unreacted hydroxyl groups equivalent to that of the resin. As is conventional in the coating art, the unreacted hydroxyl and oil length are based on glycerol whether or not glycerol is used as the polyol.

The alkyd resins can be prepared by the conventional procedure of heating together at least one polycarboxylic acid, at least one polyol and at least one monocarboxylic acid or monocarboxylic-acid contributing material such as a vegetable oil at a temperature of about 150 to 250° C. until an alkyd resin having the desired acid number is reached. A preferred procedure is to heat a vegetable oil and the polyol together at a temperature of about from 150 to 250° for about 20 to 60 minutes in the presence of a basic catalyst such as litharge or calcium oxide, then add the remainder of the reactants and continue the reaction until the desired acid number is reached.

Polycarboxylic acids such as oxalic acid, malonic acid, succinic acid, sebacic acid, adipic acid, pimelic acid, suberic acid, azeleic acid, tricarballyic acid, citric acid, tartaric acid, maleic acid, phthalic acid, isophthalic acid, terephthalic acid, itaconic acid, citraconic acid, and mixtures thereof can, among others, be used in preparing the alkyd resins employed in this invention. Of course, any of the anhydrides of the aforementioned acids can be used in equivalent amounts in place of the acids. Phthalic acid or anhydride is a preferred constituent of the polycarboxylic acid component.

The monocarboxylic acid component can be introduced either as an oil or as a free acid. Oils which can be used to introduce the monocarboxylic acid component are, for example, non-drying oils such as coconut oil, palm oil, castor oil and olive oil; semi-drying oils such as soybean oil, corn oil, menhaden oil, cottonseed oil and cod-liver oil and drying-oils such as dehydrated castor oil, tung oil, oiticica oil, linseed oil and perilla oil. Free monocarboxylic acids are, for example, propionic acid, butyric acid, valeric acid, benzoic acid, decanoic acid, p-tertiaryl butyl benzoic acid, toluic acid, methacrylic acid and fatty acids derivable from the aforementioned oils such as linolenic, palmitic, lauric, capric, caprylic, myristic, stearic and oleic acids.

Typical polyols useful in the alkyd resin are, for example, ethylene glycol, propylene glycol, tetramethylene glycol, pentamethylene glycol, hexamethylene glycol, 1,1,1-trimethylol propane, 1,1,1-trimethylol ethane and glycerol. Diols such as ethylene glycol, propylene glycol and tetramethylene glycol together with glycerol in the form of oils are the preferred polyols.

The compatability of the aforementioned alkyd resins can be increased by chemically combining part of the unmodified polymers of methyl methacrylate used in the topcoat compositions with the alkyd resins before the compositions are formulated. This can be conveniently done by using a small amount, for example 1 to 5% and preferably 2 to 4% based on the total weight of reactants of an unsaturated acid such as maleic, itaconic, acrylic or preferably methacrylic acid as part of the monocarboxylic acid or polycarboxylic acid components of the alkyd resin. A small amount of vinyl polymerization inhibitor such as hydroquinone or tertiary amylnitrite can be used to prevent the homopolymerization of the unsaturated acid. The alkyd resin, prepared as described above, is then heated at atmospheric or elevated pressure at a temperature of 50 to 110° C. for about 2 to 20 hours with methyl methacrylate or methyl methacrylate and a small amount of the aforementioned copolymerizable monomers in the presence of a free-radical catalyst. The resulting mixture contains a blend of polymer of methyl methacrylate, monocarboxylic acid modified alkyd resin, and polymer of methyl methacrylate having the alkyd resin chemically combined therewith.

Other film-forming materials which are compatible and do not react with the essential film-forming materials in the topcoating compositions can be added thereto in small amounts. Such film-forming materials include, for example, nitrocellulose, polyethyl methacrylate, polybutyl methacrylate, polyvinyl acetate, polyvinyl chloride and polyacrylonitrile. If the polymer of methyl methacrylate containing the aminated or ammoniated glycidyl methacrylate radical is used in a separate underlayer in the finishing system of this invention considerably more latitude in selecting such optional film-forming materials for use in the subsequent layers in the topcoat is obtained.

The preferred finishing systems of this invention consist of a pigmented prime coat in adherent contact with a substrate, preferably a metal substrate, and an adherent topcoat of methyl methacrylate lacquer in adherent contact with the prime coat; however, it is obvious, for example, that several layers of conventional prime coats can be used under several layers of methyl methacrylate lacquer topcoat. The critical requirement is that the layer of topcoat in direct contact with the prime coat contain at least one polymer of methyl methacrylate containing 20 to 0.2% by weight of the aminated or ammoniated glycidyl radical exclusive of amino residues based on the total weight of polymers of methyl methacrylate in that layer.

The finishing systems of this invention makes it possible to directly adhere durable, glossy, methyl methacrylate lacquer topcoats to conventional metal-protecting and rust-inhibiting prime coats to which methyl methacrylate lacquers characteristically do not otherwise adhere. The system also has great flexability; for example, if the ammoniated or aminated glycidyl methacrylate radical is introduced into a polymer of methyl methacrylate in a separate underlayer in the topcoat, the underlayer can be applied in a thin coat without separate drying or baking, yet still give the resulting product excellent intercoat adhesion. Furthermore, such systems are relatively insensitive to the solvents used in the top layer or layers of the topcoat; thus, for example, up to 75% by weight of high-boiling thinner such as ethylene glycol monoethylether acetate can be used in the subsequent layer or layers of methyl methacrylate lacquer without any detrimental effect on intercoat adhesion and metal-to-coating adhesion of the resulting product.

The aminated or ammoniated glycidyl methacrylate radical can also be introduced into a polymer of methyl methacrylate and used together with other polymers of methyl methacrylate, cellulose acetate butyrate or compatible alkyd resins in an adherent single-layer topcoat composition. The topcoats containing a polymer of methyl methacrylate and a compatible alkyd resin or cellulose acetate butyrate are also characterized by their excellent balance of thermoplasticity, craze resistance and unbuffed gloss. Furthermore, conventional methyl methacrylate lacquers or methyl methacrylate lacquers containing a compatible alkyd resin or cellulose acetate butyrate or a combination thereof can be used over an underlayer containing a polymer of methyl methacrylate containing the aminated or ammoniated glycidyl methacrylate radical to produce adherent multi-layer finishing systems.

This application is a continuation-in-part of my copending application Serial No. 659,364, filed May 15, 1957, now abandoned.

The following examples are intended to illustrate the invention and not to limit it in any way. Parts are by weight unless otherwise specified.

Examples I to VIII illustrate the embodiment of this invention wherein a polymer of methyl methacrylate containing the aminated or ammoniated glycidyl methacrylate radical is used in a separate underlayer in the topcoat of a finishing system.

EXAMPLE I

*Preparation of underlayer composition*

The following materials were charged to an autoclave and heated for 6 hours at 90° C.:

| | Parts |
|---|---|
| Methyl methacrylate | 97.8 |
| Glycidyl methacrylate | 2.2 |
| Isopropyl alcohol | 55.0 |
| Toluene | 45.0 |
| Benzoyl peroxide-initiator | 0.7 |
| | 200.7 |

The resulting polymer of methyl methacrylate containing a glycidyl methacrylate moiety had a relative viscosity of about 1.14 as determined by A.S.T.M.-D-445-46T described hereinbefore.

The polymer solution described above was diluted to 30% solids with 74 parts of isopropyl alcohol and 61 parts of toluene. Next, about 1.2 parts of anhydrous ammonia were added to 200 parts of the diluted polymer solution, and the mixture was held at about 90° C. for 400 minutes. The amount of ammonia used was 10 times that theoretically needed to react with all the free epoxy groups. The resulting polymer of methyl methacrylate containing the ammoniated glycidyl methacrylate radical had substantially no unreacted epoxy groups.

A mill base was prepared by milling 39.2 parts of the polymer solution just described with 42.6 parts of xylene, 14.7 parts of titanium dioxide pigment and 3.5 parts of dimethyl dioctadecyl ammonium bentonite ("Bentone" 34, a product of the National Lead Co.) until a smooth dispersion was obtained. Finally, the under lacquer was completed by mixing 100 parts of the mill base with 117 parts of the aforementioned polymer solution and 19.7 parts of benzyl butyl phthalate plasticizer.

*Preparation of methyl methacrylate lacquer*

A methyl methacrylate lacquer was prepared by grinding together the following materials in a paint mill until a smooth, uniform dispersion was formed.

|  | Parts |
|---|---|
| Copolymer of 98 parts of methyl methacrylate and 2 parts of methacrylic acid | 7.3 |
| Homopolymer of methyl methacrylate | 13.2 |
| Benzyl butyl phthalate | 8.4 |
| Dimethyl dioctadecyl ammonium bentonite | 1.8 |
| Titanium dioxide pigment | 14.3 |
| Phthalocyanine blue | 0.1 |
| Toluene | 30.2 |
| Xylene | 14.9 |
| Acetone | 9.8 |
|  | 100.0 |

The copolymer and the homopolymer of methyl methacrylate had relative viscosities of about 1.130 and 1.143 respectively, determined as described hereinbefore.

*Preparation of coated article*

Steel panels treated with conventional rust inhibitor ("Bonderite," a product of Parker Rust-Proof Co.) were prime coated with a conventional primer containing 100 parts of a 52% soya oil modified glycerol phthalate resin as the film-forming material and pigment consisting of 39 parts of calcium carbonate, 9 parts of carbon black and 5 parts of zinc chromate. The prime coat was baked for 25 minutes at 200° C. to give a coating about 0.5 mil thick.

The underlayer composition described in this example was diluted to about 20% solids with a solvent mixture of glycol monoacetate, acetone, isopropyl alcohol, xylene, and butanol in about a 3:6:4:6:1 weight ratio and sprayed over the baked prime coat, then a layer of the aforementioned methyl methacrylate lacquer was sprayed over the underlayer. Finally, the whole coating was baked at 93° C. for 30 minutes. The resulting finishing system consisted of a prime coat about 0.5 mil thick in adherent contact with the metal panel, and a topcoat consisting of an underlayer about 0.4 mil thick in adherent contact with the prime coat and a top layer methyl methacrylate lacquer about 2.0 mils thick in adherent contact with the underlayer.

*Evaluation of the coated article*

The coated panel was tested for adhesion of the primer to the metal and for intercoat adhesion by cutting two two-inch long marks in the form of an X vertically through the coating down to the metal, securely pressing a strip of pressure-sensitive cellophane adhesive tape over the X, then pulling the adhesive tape off with a force approximately tangential to the coated surface. When the tape test was done on the coated panels of this example, none of the coatings were removed with the tape. When the same test was made on panels which had the same baked prime coats and topcoats as those described in this example but no underlayer, almost all of the topcoat under the tape was stripped from the prime coat.

When the tip of a knife blade was scraped over the surface of the coated article, none of the topcoat flaked off. Even when the finishing system was cut through to the metal, the individual layers of the multi-layer coating did not separate. In addition, the finishing system of this example showed excellent corrosion resistance (salt spray), excellent durability and gloss and excellent resistance to blistering after prolonged immersion in water.

The primer used in this example is illustrative of the conventional primers which can be used in the finishing system of this invention. Another conventional primer which can be substituted for the primer used in this example and in the succeeding examples contains 80 parts of dehydrated castor oil modified alkyd resin, 10 parts of butylated urea-formaldehyde resin, 10 parts of esterified epoxyhydroxy polyether resin, such as the dehydrated castor oil modified reaction product of epichlorohydrin and bis(4-hydroxy phenyl)-2,2-propane sold by the Devoe and Raynolds Co., Inc. under the proprietary name of "Epi-tex" 1360, pigment consisting of 100 parts of ferric oxide, 160 parts of aluminum silicate and 55 parts of silica and solvent consisting of 105 parts of aromatic hydrocarbon boiling between 165 and 175° C., 65 parts of xylene and 5 parts of methanol.

EXAMPLE II

Ninety-five parts of methyl methacrylate and 5 parts of glycidyl methacrylate were polymerized as described in Example I to yield a polymer of methyl methacrylate having a relative viscosity of about 1.15. About 125 parts of a 40% solution of this polymer in a mixture of toluene and acetone in a 70/30 weight ratio were mixed with 30 parts of butanol and 1.04 parts of a 28% aqueous solution of ammonia, approximately that amount of ammonia needed to react with substantially all the epoxy groups in the copolymer. The resulting mixture was heated for 17 hours at 51° C., then diluted, flow-coated on primed steel panels, and coated with methyl methacrylate lacquer and baked as described in Example I. The resulting product had properties comparable to those of the undercoated panels of the preceding example.

EXAMPLE III

A polymer of methyl methacrylate was prepared by mixing 125 parts of the 40% solution of the polymer of methyl methacrylate containing the glycidyl methacrylate radical described in Example II with 50 parts of butanol and 3.1 parts of a 25% aqueous solution of dimethyl amine, then heating the mixture for 6 hours at 85° C. The resulting product had substantially no unreacted epoxy groups. The resulting polymer of methyl methacrylate containing aminated glycidyl methacrylate radicals was next formulated into a pigmented underlayer lacquer. First, 39.2 parts of polymer solution were mixed with 42.6 parts of xylene, 14.7 parts of titanium dioxide pigment, and 3.5 parts of dimethyl dioctadecyl ammonium bentonite and ground to form a mill base. Forty-four parts of the mill base were then mixed with 44 more parts of the polymer solution, 3.7 parts of toluene and 7.5 parts of benzyl butyl phthalate plasticizer to yield a coating composition. A second polymer solution similar to that described above was prepared and used without being pigmented. Both underlayer compositions were diluted to between 10 and 20% solids, applied to primed steel panels. Finally, a top layer of methyl methacrylate lacquer was applied therefover and baked as described in Example I. The dried underlayers ranged in thickness from 0.1 to 0.5 mil.

All of the finishing systems, including those having both pigmented and unpigmented underlayers, had excellent metal-to-primer and intercoat adhesion. They showed no blistering after being immersed in water at 38° C. for 168 hours.

EXAMPLE IV

A polymer of methyl methacrylate was prepared by heating 125 parts of the 40% solids polymer solution shown in Example II with 20 parts of butanol and 1.28 parts of tertiary butyl amine for 24 hours at 91° C. The resulting solution was diluted with an equal weight of methyl ethyl ketone and flow coated on steel panels which had been primed as shown in Example I. A top layer of the methyl methacrylate lacquer described in Example I was coated over the underlayer and baked at 93° C. for 30 minutes. The resulting products had a topcoat consisting of a top layer of lacquer about 2.2 mils thick and an underlayer about from 0.1 to 0.3 mils thick. The products of this example had the same excellent properties as the products of the preceding examples.

EXAMPLE V

A polymer containing aminated glycidyl methacrylate radicals was prepared by heating 125 parts of the copolymer solution shown in Example II with 75 parts of butyl acetate and 1.78 parts of N,N'-dimethyl benzyl amine for 16 hours at about 85 to 88° C. The N,N'-dimethyl benzyl amine was about 75% of that required to react with all of the epoxy groups in the copolymer. The polymer solution of this example was coated on primed steel panels, then a toplayer of methyl methacrylate lacquer was applied thereover and baked as described in the preceding examples to yield finishing systems with very good intercoat adhesion.

EXAMPLE VI

Ninety-eight parts of methyl methacrylate and 2 parts of glycidyl methacrylate were polymerized as described in Example I. A polymer of methyl methacrylate containing aminated glycidyl methacrylate radicals was prepared by heating 125 parts of a 40% solution of this copolymer with 30 parts of butanol, 32 parts of methyl ethyl ketone, 3 parts of water and 0.43 part of ethanolamine at about 86° C. for 72 hours. The resulting solution was diluted to about 10% solids and used as an underlayer in a methyl methacrylate finishing system. Products coated with a conventional primer similar to that described in Example I, the clear underlayer lacquer of this example and a toplayer of methyl methacrylate lacquer had excellent intercoat adhesion and metal-to-primer adhesion.

EXAMPLE VII

A polymer was prepared by heating 99 parts of methyl methacrylate with 1 part of glycidyl methacrylate and 105 parts of toluene, 45 parts of acetone and 0.7 part of benzoyl peroxide at 85° C. for 16 hours. The resulting polymer had a relative viscosity of about 1.15.

An underlayer composition was prepared by adding 25 parts of isopropyl alcohol and 2.15 parts of 28% aqueous ammonia solution to the aforementioned polymer solution and heating the resulting mixture for an additional 16 hours at 85° C. The resulting product was diluted to about 20% solids and flow coated onto steel panels which had been prime coated with the soya oil modified glycerol phthalate primer mentioned in Example I. A toplayer of methyl methacrylate lacquer was sprayed over the underlayer and the resulting finishing system was baked for 30 minutes at 93° C. The resulting product had excellent intercoat adhesion.

EXAMPLE VIII

A polymer having a relative viscosity of about 1.16 was prepared from 85 parts of methyl methacrylate and 15 parts of glycidyl methacrylate by a procedure similar to that shown in Example I. A polymer of methyl methacrylate containing aminated glycidyl methacrylate radicals was prepared by heating 125 parts of a 40% solution of the polymer in a mixture of acetone and toluene with 35 parts of butyl acetate, 40 parts of methyl ethyl ketone and 1.78 parts of N,N'-dimethyl benzyl amine at about 87° C. for 16 hours. The resulting undercoat composition was flow-coated onto a primed steel panel, then a toplayer of methyl methacrylate lacquer was applied thereover and baked for 30 minutes at 93° C. The resulting product had very good intercoat adhesion.

The following examples illustrate the embodiment of this invention wherein a polymer of methyl methacrylate containing the aminated or ammoniated glycidyl methacrylate radical is used in a methyl methacrylate lacquer which is applied in a single-layer topcoat in the finishing systems of this invention.

EXAMPLE IX

A solution in a mixture of solvents similar to that described in the preceding examples containing 75 parts of a homopolymer of methyl methacrylate having a relative viscosity of about 1.15 and 25 parts of the polymer of methyl methacrylate containing the ammoniated glycidyl methacrylate radical used in Example I, about 40 parts of butyl benzyl phthalate and 4 parts of dimethyl dioctadecyl ammonium bentonite was prepared. The resulting methyl methacrylate lacquer was coated onto steel panels coated with a conventional alkyd resin prime coat as described in Example I. The resulting finishing system was baked at 93° C. for about 20 minutes to yield an article consisting of a metal substrate, a pigmented prime coat and an adherent clear single-layer topcoat of methyl methacrylate lacquer about 2.0 mils thick.

The article described above was evaluated by tape and knife tests described hereinbefore. In the tape test none of the topcoat was removed with tape. When the same test was made on panels which had the same baked prime coat and a topcoat which did not contain the polymer of methyl methacrylate containing the ammoniated glycidyl methacrylate radical, almost all of the topcoat under the tape was stripped off. In the knife test the individual layers of coating did not separate thereby indicating excellent intercoat adhesion.

EXAMPLE X

Example IX was repeated except that 90 parts of homopolymer of methyl methacrylate and 10 parts of the polymer of methyl methacrylate containing the ammoniated glycidyl methacrylate radical were used. The resulting finishing systems showed excellent metal-to-primer and intercoat adhesion.

EXAMPLE XI

Ninety-eight parts of methyl methacrylate and 2 parts of glycidyl methacrylate were polymerized as described in Example I. About 125 parts of the resulting 40% solution were mixed with 30 parts of butanol, 32 parts of methyl ethyl ketone, 3 parts of water and 0.43 part of ethanol amine and heated at about 86° C. for 72 hours. Example IX was repeated except that 25 parts of the polymer of methyl methacrylate prepared as described above were substituted for the polymer of methyl methacrylate containing the ammoniated glycidyl methacrylate radical used in that example. The resulting finishing system showed the same excellent adhesion as the system shown in Example IX.

EXAMPLE XII

A mill base was prepared by grinding together 19 parts of the 30% solution of polymer of methyl methacrylate containing the ammoniated glycidyl methacrylate radical described in Example I, 19.3 parts of xylene, 58 parts of titanium dioxide and 3.7 parts of benzyl butyl phthalate.

The resulting mill base was mixed with the following ingredients to form a methyl methacrylate lacquer having the following composition:

| | Parts |
|---|---|
| Polymer of methyl methacrylate containing aminated glycidyl methacrylate radical | 2.9 |
| Homopolymer of methyl methacrylate (relative visc. 1.14) | 15.4 |
| Benzyl butyl phthalate | 7.5 |
| Dimethyl dioctadecyl ammonium bentonite | 1.5 |
| Titanium dioxide | 20.0 |
| Solvent | 52.7 |
| | 100.0 |

The resulting composition was applied on a primed steel panel and dried at 93° C. for 20 minutes as described in the preceding examples. The resulting finishing system had excellent properties similar to those of the systems in the preceding examples.

EXAMPLE XIII

A composition similar to that described in the preceding example was prepared except that the film-forming materials consisted of 10.8 parts of homopolymer of methyl methacrylate, 1.8 parts of a copolymer of 98% of methyl methacrylate and 2% of methacrylic acid and 5.8 parts of the polymer of methyl methacrylate containing the ammoniated glycidyl methacrylate radical used in Example I. The resulting composition was coated onto primed steel panels and dried at 93° C. for 30 minutes to yield a finishing system, having excellent metal-to-primer and intercoat adhesion.

EXAMPLE XIV

A methyl methacrylate lacquer was prepared by milling together the following materials to form a smooth dispersion:

| | Parts |
|---|---|
| Polymer of methyl methacrylate containing ammoniated glycidyl methacrylate radical (30% solution of Example I) | 73.3 |
| Homopolymer of methyl methacrylate (40% solution in 70:30 toluene:acetone solvent) | 122.5 |
| Benzyl butyl phthalate | 29.0 |
| Lacquer grade nitrocellulose | 3.0 |
| Phthalocyanine blue pigment | 0.1 |
| Aluminum flake pigment (65% solids paste) | 2.8 |
| Solvent | 137.2 |

This methyl methacrylate lacquer was thinned, sprayed directly over prime-coated automobile bodies and baked 30 minutes at 93° C. The topcoat had excellent adhesion to the primer whereas an analogous composition which contained additional unmodified homopolymer of methyl methacrylate instead of the polymer of methyl methacrylate containing the ammoniated glycidyl methacrylate radical had poor adhesion.

EXAMPLE XV

An alkyd resin was prepared by first mixing together 1160 parts of coconut oil, 956 parts of ethylene glycol and 2.0 parts of litharge and heating the mixture at 195° C. for 35 minutes in a carbon dioxide atmosphere. Next, 1811 parts of phthalic anhydride and 118 parts of methacrylic acid were added to the charge and the mixture was heated for 18 hours at 170 to 215° C. Toluene was added from time to time to reduce the temperature of the reaction mixture and carry off water by product. The resulting monocarboxylic acid modified alkyd resin had an acid number of 4.0, an oil length of 35, 4% unreacted hydroxyl calculated as glycerol and a Gardner Holdt viscosity at 75% solids of E+½.

A coating composition was prepared by mixing, in lacquer solvents consisting principally of a mixture of toluene, isopropyl alcohol and acetone, 40 parts of the alkyd resin prepared above, 20 parts of the polymer of methyl methacrylate containing the ammoniated glycidyl methacrylate radical used in Example I and 40 parts of a homopolymer of methyl methacrylate having a relative viscosity of about 1.14. The coating composition was coated onto a steel panel prime coated with a 50% soybean oil modified alkyd resin primer and baked for 2 hours at 93° C. The resulting finishing system had superior adhesion. In addition the system of this example is characterized by its unbuffed gloss and balance between thermoplasticity and craze resistance. Craze resistance was measured by placing a drop of methyl ethyl ketone on the topcoat held at 60° F. and 40% relative humidity. No fine cracks (crazing) appeared in the finish. Normally a material such as dimethyl dioctadecyl ammonium bentonite must be added to methyl methacrylate lacquer compositions to prevent crazing; however, such materials make it necessary to buff coatings to bring out gloss. With the system of this example the gloss was high without buffing.

EXAMPLE XVI

An alkyd resin was prepared by heating together the following ingredients in an inert atmosphere at a temperature of 175 to 225° C. until an acid number of about 5 was reached:

| | Parts |
|---|---|
| Ethylene glycol | 1199 |
| Glycerol | 110 |
| Phthalic anhydride | 2422 |
| Paratertiary butyl benzoic acid | 638 |
| Methacrylic acid | 117 |

Toluene was added from time to time during the reaction to keep the reaction temperature below 225° C. The resulting resin contained 73.8% solids and had an acid number of about 5, about 3% excess hydroxyl and an oil length of about 25.

The alkyd resin described above was mixed with polymers of methyl methacrylate and cellulose acetate butyrate to yield the following methyl methacrylate lacquer:

| | Parts |
|---|---|
| Alkyd resin | 3.6 |
| Polymer of methyl methacrylate containing ammoniated glycidyl methacrylate radical (same as Example I) | 9.0 |
| Homopolymer of methyl methacrylate (same as Example XV) | 11.5 |
| Cellulose acetate butyrate (half-second viscosity) | 6.8 |
| Tricresyl phosphate | 5.0 |
| Solvent | 64.1 |
| | 100.0 |

The methyl methacrylate lacquer described above was coated onto a primed steel panel and baked to yield a finishing system comparable to that of the preceding example.

EXAMPLE XVII

A polymer of methyl methacrylate having a relative viscosity of between 1.117 and 1.196 was prepared by heating the following ingredients at autogenous pressure in a nitrogen atmosphere for 16 hours.

| | Parts |
|---|---|
| Methyl methacrylate | 92.8 |
| Lauryl methacrylate | 5.0 |
| Glycidyl methacrylate | 2.2 |
| Benzoyl peroxide | 0.7 |
| Toluene | 105.0 |
| Isopropyl alcohol | 45.0 |
| | 250.7 |

The resulting reaction mixture was diluted to 30% solids with isopropyl alcohol. Next, 4.2 parts of anhydrous ammonia were bubbled into the reaction mixture at room temperature, then the reaction vessel was sealed and the reaction was continued at 85° C. for 7½ hours.

A methyl methacrylate lacquer was prepared by blending 75 parts of the polymeric solution described above with 25 parts of a 40% solution of a homopolymer of methyl methacrylate similar to that used in Example XV and 25 parts of a 40% solution in toluene of a coconut oil modified glyceryl phthalate alkyd resin. The alkyd resin had an oil length of 39, about 1.5% of unreacted hydroxyl, an acid number of about 3 and a Gardner Holdt viscosity of F. The resulting coating composition when used in finishing systems as described in Examples XV and XVI gave comparable excellent results.

EXAMPLE XVIII

A methyl methacrylate lacquer having the following composition was prepared:

| | Parts |
|---|---|
| Polymer of methyl methacrylate containing ammoniated glycidyl methacrylate radical (same as Example I) | 6.3 |
| Homopolymer of methyl methacrylate (same as Example XV) | 11.5 |
| Cellulose acetate butyrate (half-second viscosity) | 7.7 |
| Benzyl butyl phthalate | 15.4 |
| Solvent | 59.1 |
| | 100.0 |

The methyl methacrylate lacquer described above was coated onto a steel panel which had been prime coated with a conventional pigmented alkyd resin prime coat, then baked for about 2 hours at 93° C. The resulting finishing system had excellent adhesion, craze resistance and gloss.

The following examples illustrate the manner in which alkyd resins can be chemically combined with part of the polymer of methyl methacrylate used in topcoats in the finishing systems of this invention.

EXAMPLE XIX

An alkyd resin consisting nominally of 19% coconut oil, 64.4% ethylene glycol phthalate, 10.3% ethylene glycol adipate and 3.2% of ethylene glycol dimethacrylate was prepared by the general procedure described in Example XV. The resin had an oil length of about 22, an acid number of 1.5 and about 3.3% of unreacted hydroxyl. Four hundred parts of a 75% solution in toluene of alkyd resin, 200 parts of methyl methacrylate, 425 parts of toluene, 225 parts of acetone and 1.49 parts of benzoyl peroxide were heated together under autogenous pressure at about 85° C. for 16 hours. The resulting reaction mixture contained a mixture of free alkyd resin, methyl methacrylate polymer chemically combined with alkyd resin and free methyl methacrylate polymer in which the ratio of alkyd resin to polymerized methyl methacrylate was about 60/40.

Two hundred parts of the reaction mixture prepared above were mixed with 100 parts of a 30% solution of the polymer of methyl methacrylate containing the ammoniated glycidyl methacrylate radical described in Example I. The resulting methyl methacrylate lacquer when used in finishing systems as described in Examples XV to XVIII gave comparable excellent results.

EXAMPLE XX

An alkyd resin was prepared from the following materials by the general procedure described in Example XV:

| | Parts |
|---|---|
| Hydrogenated castor oil | 400 |
| Ethylene glycol | 614 |
| Litharge | 1 |
| Phthalic anhydride | 1242 |
| Methacrylic acid | 60 |
| Toluene | 84 |

The resulting resin had an acid number of 2.2.

Sixty-seven parts of a 75% solution in toluene of the alkyd resin described above, 50 parts of methyl methacrylate, 0.35 part of benzoyl peroxide, 53 parts of toluene and 30 parts of acetone were heated together under autogenous pressure for 17 hours at 85 to 90° C. Finally, 62.5 parts of the resulting mixture, 18.8 parts of a 40% solution of methyl methacrylate homopolymer, 41.7 parts of a 30% solution of the polymer of methyl methacrylate containing the aminated glycidyl methacrylate radical shown in Example I and 6.0 parts of toluene were mixed to form a methyl methacrylate lacquer. When the resulting coating composition was applied over conventional pigmented primers, the resulting finishing system had excellent gloss, craze resistance and adhesion.

EXAMPLE XXI

An alkyd resin was prepared by the general procedure outlined in Example XV from the following materials:

| | Parts |
|---|---|
| Coconut oil | 1500 |
| Glycerol | 607 |
| Phthalic anhydride | 792 |
| Maleic anhydride | 249 |
| Xylene | 1809 |

The resulting solution contained 65% of an alkyd resin having an acid number from 9 to 10 and an oil length of 50.

About 460 parts of the alkyd resin solution described above, 96 parts of xylene, 200 parts of n-butyl alcohol and 7 parts of benzene phosphonous acid were heated to 115° C. Next, a mixture of 160 parts of methyl methacrylate, 40 parts of acrylonitrile, 300 parts of xylene and 25 parts of cumene hydroperoxide were added dropwise to the reaction mixture over a period of about 4 hours. After all the reactants had been added heating was continued for an additional 5 hours at 115° C. The resulting solution contained 38% solids consisting of nominally 32 parts of polymerized methyl methacrylate, 8 parts of polymerized acrylonitrile and 60 parts of alkyd resin.

A coating composition particularly useful in the finishing systems of this invention was prepared by grinding the pigments of the following formula with the alkyd resin polymer of methyl methacrylate solution described above and mixing the resulting dispersion with the other ingredients shown below:

| | Parts |
|---|---|
| Titanium dioxide | 22.6 |
| Yellow pigment ("Sun Yellow N," Harshaw Chemical Co.) | 12.5 |
| Polymer solution described above | 166.7 |
| Polymer of methyl methacrylate containing ammoniated glycidyl methacrylate radical (30% solution of Example I) | 131.5 |
| Toluene | 13.2 |
| | 346.5 |

I claim:

1. An article which comprises a substrate having an adherent multi-layer coating which comprises a pigmented prime coat in adherent contact with said substrate and a superposed topcoat in adherent contact with said prime coat, each layer of said topcoat having as the essential film-forming material at least one polymer of methyl methacrylate, at least one polymer of methyl methacrylate in the layer of said topcoat immediately adjacent to said prime coat containing in the polymer chain the radical:

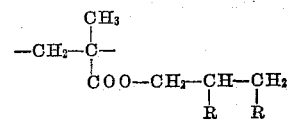

wherein one R is selected from the class consisting of a hydroxyl group and an oxygen anion and the second R is an amino residue of a member of the class consisting of ammonia and monoamines, said residue being bonded through amino nitrogen, said radical exclusive of said amino residue constituting about from 20 to 0.2% of the total weight of polymer of methyl methacrylate in said topcoat layer containing said radical.

2. An article which comprises a substrate having an adherent multi-layer coating which comprises a pigmented prime coat in adherent contact with said substrate and a superposed topcoat in adherent contact with said prime coat, said topcoat comprising an underlayer having as the essential film-forming constituent at least one polymer of methyl methacrylate containing in the polymer chain the radical:

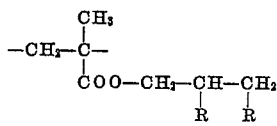

wherein one R is selected from the class consisting of a hydroxyl group and an oxygen anion and the second R is an amino residue of a member of a class consisting of ammonia and monoamines, said residue being bonded through amino nitrogen, said radical exclusive of said amino residue constituting about from 20 to 0.2% of the total weight of polymer of methyl methacrylate in said underlayer and at least one toplayer of methyl methacrylate lacquer.

3. An article of claim 2 wherein said radical exclusive of amino residue constitutes from about 3 to 0.4% of the total weight polymer of methyl methacrylate in said underlayer.

4. An article of claim 3 wherein each polymer of methyl methacrylate in said topcoat has a relative viscosity from about 1.117 to 1.196.

5. An article of claim 3 wherein said underlayer has as the essential film-forming constituent at least one polymer of methyl methacrylate containing in the polymer chain the radical:

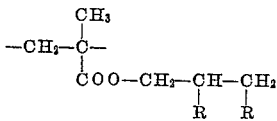

wherein one R is a hydroxyl group and the second R is —NH$_2$.

6. An article which comprises a substrate having an adherent multi-layer coating which comprises a pigmented prime coat in adherent contact with said substrate and a superposed topcoat in adherent contact with said prime coat, said topcoat having as essential film-forming materials in each layer thereof at least 50 parts by weight of at least one polymer of methyl methacrylate, up to 50 parts by weight of a compatible monocarboxylic acid modified alkyd resin and up to 35 parts by weight of cellulose acetate butyrate for a total of 100 parts by weight of film-forming materials, at least one polymer of methyl methacrylate containing in the polymer chain the radical:

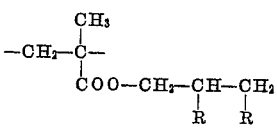

wherein one R is selected from the class consisting of a hydroxyl group and an oxygen anion and the second R is an amino residue of a member of a class consisting of ammonia and monoamines, said residue being bonded through amino nitrogen, said radical exclusive of said amino residue constituting about from 20 to 0.2% of the total weight of polymer of methyl methacrylate.

7. An article of claim 6 wherein each layer of said topcoat has as essential film-forming materials at least two polymers of methyl methacrylate, one of which contains said radical.

8. An article of claim 6 wherein each layer of said topcoat has as an essential film-forming material about from 10 to 25 parts by weight of cellulose acetate butyrate.

9. An article of claim 6 wherein each layer of said topcoat has as an essential film-forming material about from 30 to 40 parts of said compatible monocarboxylic acid modified alkyd resin.

10. An article of claim 6 wherein said radical exclusive of amino residue constitutes about from 3 to 0.4% of the total weight of polymer of methyl methacrylate.

11. An article of claim 6 wherein each layer of said topcoat has as an essential film-forming constituent at least one polymer of methyl methacrylate containing in the polymer chain the radical:

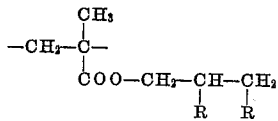

wherein one R is a hydroxyl group and the second R is —NH$_2$.

12. A coating composition which comprises organic solvent and as the essential film-forming materials at least 50 parts by weight of at least one polymer of methyl methacrylate, up to 50 parts by weight of a compatible monocarboxylic acid modified alkyd resin and up to 35 parts by weight of cellulose acetate butyrate for a total of 100 parts by weight of film-forming materials, at least one polymer of methyl methacrylate containing in the polymer chain the radical:

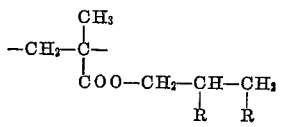

wherein one R is selected from the class consisting of a hydroxyl group and an oxygen anion and the second R is an amino residue of a member of a class consisting of ammonia and monoamines, said residue being bonded through amino nitrogen, said radical exclusive of said amino residue constituting about from 20 to 0.2% of the total weight of polymer of methyl methacrylate.

13. A coating composition of claim 12 which has as the essential film-forming materials at least two polymers of methyl methacrylate, one of which contains said radical.

14. A coating composition of claim 12 which has as an essential film-forming material about from 10 to 25 parts by weight of cellulose acetate butyrate.

15. A coating composition of claim 12 which has as an essential film-forming material about from 30 to 40 parts by weight of said compatible monocarboxylic acid modified alkyd resin.

16. A coating composition of claim 12 wherein said radical exclusive of amino residue constitutes about from 3 to 0.4% of the total weight of polymer of methyl methacrylate.

17. A coating composition of claim 12 which has as an essential film-forming constituent at least one polymer of methyl methacrylate containing in the polymer chain the radical:

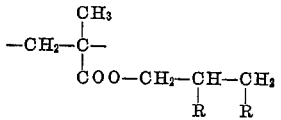

wherein one R is a hydroxyl group and the second R is —NH$_2$.

18. A process for improving the adhesion of methacrylate lacquer to a substrate having an adherent pigmented prime coat which comprises applying immediately over said prime-coated substrate a liquid coating composition which comprises organic solvent and as the essential film-forming material at least one polymer of methyl methacrylate, at least one polymer of methyl methacrylate containing in the polymer chain the radical:

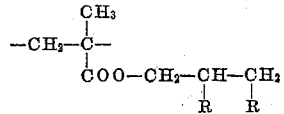

wherein one R is selected from the class consisting of a hydroxyl group and an oxygen anion and the second R is an amino residue of a member of the class consisting of ammonia and monoamines, said residue being bonded through amino nitrogen, said radical exclusive of said amino residue constituting about from 20 to 0.2% of the total weight of polymer of methyl methacrylate and drying said coating.

References Cited in the file of this patent
UNITED STATES PATENTS

| | | |
|---|---|---|
| 2,676,166 | Webers | Apr. 20, 1954 |
| 2,782,131 | Johnson | Feb. 19, 1957 |
| 2,782,132 | Johnson | Feb. 19, 1957 |
| 2,823,140 | Lowell | Feb. 11, 1958 |
| 2,842,459 | Gollub et al. | July 8, 1958 |
| 2,849,409 | Evans | Aug. 26, 1958 |